US006971584B2

(12) United States Patent
Schmitt et al.

(10) Patent No.: US 6,971,584 B2
(45) Date of Patent: Dec. 6, 2005

(54) METHOD AND APPARATUS FOR PREVENTING FOGGING ON THE WINDOWS OF A MOTOR VEHICLE

(75) Inventors: Hans-Michael Schmitt, Muennerstadt (DE); Juergen Bach, Bad Neustadt (DE); Guenther Oennig, Salz (DE); Thomas Polzer, Bad Neustadt (DE); Martin Blaufuss, Suelzfeld (DE)

(73) Assignee: Preh Werke GmbH & Co. KG, Bad Neustadt a.d. Saale (DE)

( * ) Notice: Subject to any disclaimer, the term of this patent is extended or adjusted under 35 U.S.C. 154(b) by 0 days.

(21) Appl. No.: 10/831,324

(22) Filed: Apr. 26, 2004

(65) Prior Publication Data

US 2004/0195343 A1 Oct. 7, 2004

Related U.S. Application Data

(63) Continuation of application No. PCT/EP02/10870, filed on Sep. 27, 2002.

(30) Foreign Application Priority Data

Oct. 26, 2001 (DE) ................................ 101 53 000

(51) Int. Cl.$^{7}$ .......................... E06B 7/12; G05D 21/00; B01F 3/02; F25D 21/00

(52) U.S. Cl. ...................... 236/44 R; 236/44 A; 62/80; 62/140

(58) Field of Search ............................ 236/44 R, 44 A; 62/80, 140, 150, 239

(56) References Cited

FOREIGN PATENT DOCUMENTS

| | | | |
|---|---|---|---|
| DE | 43 16 557 | A1 | 11/1994 |
| DE | 196 32 059 | A1 | 2/1998 |
| DE | 196 46 851 | A1 | 2/1998 |
| DE | 199 07 401 | A1 | 8/2000 |

*Primary Examiner*—Chen Wen Jiang
(74) *Attorney, Agent, or Firm*—Birch, Stewart, Kolasch & Birch, LLP

(57) ABSTRACT

The regulated heating and air conditioning installations normally enable, when controlled, integration of the main factors affecting the comfort of passengers, in particular preventing the windscreen and the other windows from getting clouded. In order to detect incipient mist formation, condensation and moisture sensors generate detection signals, which initiate steps for preventing mist formation when a threshold value is exceeded. Measures are taken for preventing mist formation based on requirements and in a manner adapted to the changing moisture conditions of the glass panes, for example, by using points of intervention stored in a processor. Steps are therefore taken to prevent mist formation, based on moisture variation gradients of the glass panes. Depending on the moisture of the glass panes varying in time and in terms of values, each point of intervention is generally set on as soon as possible, but the latest possible, the local conditions and local meteorological elements being taken into consideration when the method is applied.

10 Claims, 1 Drawing Sheet

METHOD AND APPARATUS FOR PREVENTING FOGGING ON THE WINDOWS OF A MOTOR VEHICLE

This nonprovisional application is a continuation application of International Application PCT/EP02/10870, which was filed in German on Sep. 27, 2002, which claims priority to German Patent Application No. De 101 53 000.5 filed in Germany on Oct. 26, 2001, and which are herein incorporated by reference.

BACKGROUND OF THE INVENTION

1. Field of the Invention

The present invention relates to a method and apparatus for preventing fogging of windows.

2. Description of the Background Art

As is well known, the variables that are important to perceived comfort are taken into account in the control of regulated heating and air conditioning systems. More particularly, the onset of fogging on the windshield or other windows should be prevented in this context. Fogging occurs when, for a given relative humidity in the motor vehicle, the window temperature is or becomes colder than the air temperature in the passenger compartment due to external influences, and thus drops below the dew point at the interior surface of the glass. A sudden increase in the humidity in the passenger compartment also increases the danger of fogging. Condensation or humidity sensors, whose sensor signals can activate anti-fogging measures, are used to detect the onset of fogging.

DE 199 07 401 A1 describes a method for preventing window fogging in a motor vehicle. In this method, a humidity sensor measures the relative humidity condensing on a window as the relative humidity of the window. The heating of the humidity sensor is determined while accounting for the incident solar radiation, and the actual relative humidity at the window is determined from this information and the measured heating. In another embodiment, the interior and/or exterior temperatures are measured and taken into account in addition to the incident solar radiation.

A method and a device for air mixture control in a heating/air conditioning system of a motor vehicle is described in DE 196 32 059 C2. This method and device are intended to contribute to optimization of energy consumption. The specific data for optimal control are determined by measuring the temperature and relative humidity of the relevant airflow.

A device for measuring the degree of misting or icing of a motor vehicle window is disclosed by DE 43 16 557 A1. A sensor provides a signal regarding the degree of misting or icing of a large window area. This information is used for the activation of countermeasures, such as switching-on a fan motor.

SUMMARY OF THE INVENTION

It is therefore an object of the present invention to provide a method and apparatus for preventing fogging of a motor vehicle window.

The invention is based on the concept of structuring the process such that anti-fogging measures are activated as needed and in a manner suited to the behavior of the changing window humidity, by trigger points, which, for example, may be stored in a processor. In other words, appropriate anti-fogging measures are switched on as a function of the gradients, e.g., the rate of inclination, of the changing window humidity.

The individual trigger point is set to be, in general, ‘as early as possible, as late as necessary’ as a function of the value and time variation of the window humidity, where the local circumstances or local weather conditions can additionally be taken into account in implementing the process. These external variables may include the speed of the vehicle, the outside temperature and/or the sun’s position, e.g., incident solar radiation.

Thus, for example, no measures are activated in the presence of a measured, constant high window humidity, especially when this high window humidity is present in the regions where the vehicles equipped with this method are operated. In the case of slowly increasing window humidity, anti-fogging measures are activated as late as possible. In contrast, rapidly increasing window humidity causes the activation of countermeasures at an earlier time than in the case of slowly increasing window humidity.

The terms rapid and slow increase are defined in the software on the basis of experience. The relevant trigger points are also defined by means of the software, wherein the corresponding checkpoints are preferably stored in a table in a processor, e.g., memory.

Optimal well-being in the passenger compartment is achieved as a result of the fact that variable trigger points cause the measures to be activated only when truly necessary. In addition, the need-based operation of the air conditioner, etc. results in energy savings.

Activated anti-fogging measures are preferably deactivated on the basis of two considerations: sufficient distance from the dew point and the use of minimal measures for reliable prevention of fogging with minimal discomfort.

The efficiency of the measures used is monitored by, for example, the window humidity. Additional anti-fogging measures are employed as needed, for example, when the window humidity remains constantly high or continues to increase steadily.

The sensor and also the microprocessor may be integrated in a sensor module that transmits a signal directly to various anti-fogging assemblies.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
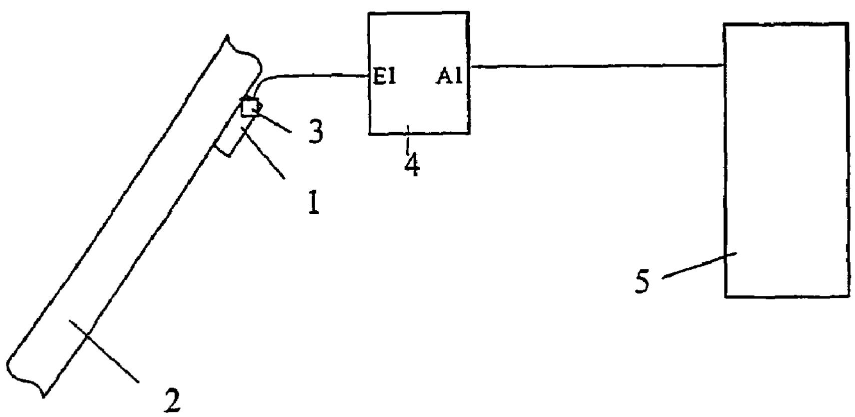
FIG. 1 is a block diagram of a preferred embodiment of the present invention.

In FIG. 1, the number 1 identifies a sensor that is applied to a window 2. The sensor 1, which is preferably designed as a sensor module and has within it signal processing electronics 3, is electrically connected to the input E1 of a microprocessor 4. The output A1 of the processor 4 is connected to various anti-fogging assemblies 5.

Stored in the processor 4 are comparison data and trigger points $EP_n$ in the form of data, which are used to detect changes in the timing and value of the window humidity F, and to activate the anti-fogging assemblies 5 either individually or together on the basis of these changes in behavior.

This method proceeds from the general condensation principle that the phase of increased tendency to fog is traversed between 0% window humidity $F_0$ and visible fogging $F_{100}$ at or above 100%. However, this increased tendency to fog results from the environmental parameters of the window 2, which can change to a greater or lesser degree, so that the window also exhibits varying behavior with respect to fogging. If an increased tendency to fog is detected at the window, where this increased tendency to fog is defined by the variable trigger points $EP_n$, the first countermeasures are initiated at this time; maximum anti-fogging measures must be activated no later than the appearance of visible fogging.

Three of the most common different circumstances or behaviors of the window humidity F are used to explain the method. These include a constant high value, a slow increase, or a rapid increase.

In accordance with an embodiment the invention, for each form of behavior of the increased tendency to fog, there is defined as a function of the changing window humidity F either no trigger point or a trigger point EP at which activation including a specified number of assemblies 5 occurs.

These trigger points EP are defined as follows:

No trigger point EP is defined for a steadily constant high window humidity F, since the measured values do not approach the threshold of visible fogging SB in this case. Only above a very high window humidity F, for example 90%, does time integration lead to activation of anti-fogging measures.

For a slowly increasing window humidity F, the trigger point $EP_2$ is chosen to occur relatively late, for example, at 90% window humidity F. This is possible since the continuously measured values only gradually approach the threshold of visible fogging SB and thus a late trigger can activate the anti-fogging measures in a timely manner even at a high window humidity F.

For a rapid increase in window humidity F, the value and timing of the trigger point $EP_3$ are significantly ahead of the trigger point $EP_2$, for example at 70% window humidity F.

The defined trigger points $EP_{2,\ 3}$ control individual switching of the measures in accordance with the circumstances.

Figure 2:
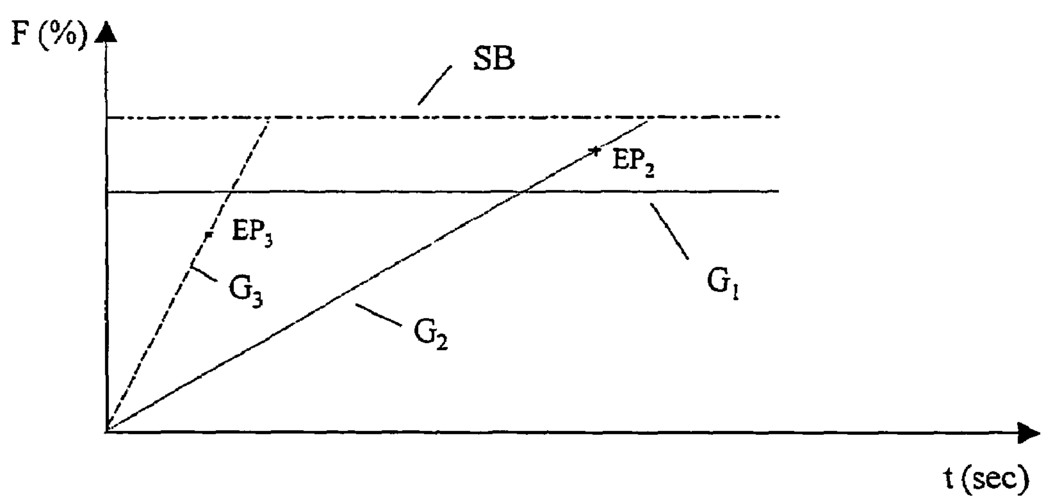
FIG. 2 is a diagrammatic representation of the functional principle of a method according to a preferred embodiment of the present invention.

These behaviors are shown in FIG. 2 in the form of three different humidity curves $G_1$, $G_2$, $G_3$. The curves $G_{1\text{-}3}$ exhibit different slopes which are arbitrarily chosen to be constant for the purpose of the example.

The first curve $G_1$ reflects the time behavior of a constant high window humidity F, the second curve $G_2$ reflects a slowly increasing window humidity F, and the third curve $G_3$ reflects a rapid increase in window humidity F. SB represents visible fogging for humidity F=100%, which functions as the threshold for the method. The trigger points $EP_{2,\ 3}$ are also shown in FIG. 2.

If a constant prevailing window humidity F is detected in functional operation by the microprocessor 4 in analyzing the sensor signals of the sensor 2, no activation of the assemblies 5 occur if this value of window humidity F remains below a defined threshold value SB.

In contrast, if the measured values rise, the microprocessor 4 evaluates whether the values are changing slowly or rapidly. Depending on the analyzed behavior, the microprocessor 4 identifies the trigger point EP stored for this behavior.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for preventing fogging of windows, the method comprising:

evaluating sensor signals; and activating anti-fogging measures when a threshold value is reached based on the evaluation of the sensor signals, wherein the anti-fogging measures are activated as a function of gradients of the changing window humidity based on stored variable trigger points whose values are defined based on the behavior of the window humidity.

2. The method according to claim 1, wherein no trigger point is defined up to a threshold value for a constant window humidity, and wherein a trigger point for a slow change in window humidity is defined at a higher value and later time than a trigger point defined for a rapid change in the window humidity.

3. The method according to claim 2, wherein the trigger point for a slow change in window humidity is chosen from the values of the stored variable trigger points when the humidity is approximately 80–90%.

4. The method according to claim 2, wherein the trigger point for a rapid change in window humidity is chosen from the values of the stored variable trigger points when the window humidity is approximately 60–70%.

5. The method according to claim 1, wherein external variables are taken into account in defining the variable trigger points.

6. The method according to claim 5, wherein the external variables include speed, outside temperature, and incident solar radiation.

7. The method according to claim 1, wherein the monitoring of the measures taken is monitored on the basis of the window humidity.

8. The method according to claim 1, wherein the window is a vehicle window.

9. The method according to claim 1, wherein the stored variable trigger points are predetermined.

10. An apparatus for preventing fogging on a window, the apparatus comprising:

a sensor being provided on the window and outputting sensor signals; and a processor for receiving and evaluating the sensor signals and based on the evaluation of the sensor signals, the processor controls at least one anti-fogging assembly, wherein, during the evaluation of the sensor signals by the processor, the processor determines the rate of fogging on the window and based on the rate of fogging a predetermined trigger point is selected that initiates control of the at least one anti-fogging assembly.

* * * * *